(12) United States Patent
Irani et al.

(10) Patent No.: US 8,627,323 B2
(45) Date of Patent: *Jan. 7, 2014

(54) UTILIZING USER-DEFINED WORKFLOW POLICIES TO AUTOMATE CHANGES MADE TO COMPOSITE WORKFLOWS

(75) Inventors: Majid Irani, San Jose, CA (US); John A. Owen, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 390 days.

This patent is subject to a terminal disclaimer.

(21) Appl. No.: 12/964,970

(22) Filed: Dec. 10, 2010

(65) Prior Publication Data

US 2012/0151486 A1    Jun. 14, 2012

(51) Int. Cl.
*G06F 9/46* (2006.01)
*G06Q 10/00* (2012.01)

(52) U.S. Cl.
USPC ......... 718/102; 705/7.21; 705/7.26; 705/7.27

(58) Field of Classification Search
None
See application file for complete search history.

(56) References Cited

U.S. PATENT DOCUMENTS 5,999,911 A * 12/1999 Berg et al. .............. 705/7.26
7,155,720 B2   12/2006 Casati et al.
7,802,194 B2 * 9/2010 Kol et al. .............. 715/765
7,886,053 B1 * 2/2011 Newstadt et al. .......... 709/225
8,140,860 B2 * 3/2012 Haswell .................. 713/193
2003/0153994 A1 8/2003 Jin et al.
2004/0064432 A1 4/2004 Oetringer et al.
2009/0178102 A1 7/2009 Alghathbar et al.
2009/0205018 A1 8/2009 Ferraiolo et al.

OTHER PUBLICATIONS

Wahli et al. ("Software Configuration Management A clear case for IBM Rational ClearCase and ClearQuest UCM", Dec. 2004, IBM RedBooks).*

* cited by examiner

*Primary Examiner* — Abdullah Al Kawsar
*Assistant Examiner* — Wissam Rashid
(74) *Attorney, Agent, or Firm* — Patents On Demand P.A.; Brian K. Buchheit; Scott M. Garrett

(57) ABSTRACT

Automating changes to a composite workflow using user-defined workflow policies can begin with the detection of a state change by a workflow policy handler for a record of an instance of a composite workflow running within a composite workflow system. User-defined workflow policies can be identified for the composite workflow in which the change was detected. A user-defined workflow policy can define policy actions to be performed if policy conditions are satisfied. For each identified user-defined workflow policy, the applicability to the instance of the composite workflow can be determined. If an identified user-defined workflow policy is determined to be applicable, the policy actions can be automatically performed on the instance of the composite workflow.

15 Claims, 5 Drawing Sheets

UTILIZING USER-DEFINED WORKFLOW POLICIES TO AUTOMATE CHANGES MADE TO COMPOSITE WORKFLOWS

BACKGROUND

The present invention relates to the field of composite workflow systems and, more particularly, to utilizing user-defined policies to automate changes made to composite workflows.

Composite workflow tools and/or systems like RATIONAL CLEARQUEST allow organizations to define a workflow in a hierarchical structure to represent the dependencies and/or relationships between different steps. The hierarchical structure of a composite workflow provides many benefits of linear workflow, such as parallel task performance and customizable lifecycles for records at each tier in the hierarchy. However, in providing such an open structure format to accommodate a variety of workflow configurations, many composite workflow tools/systems lack flexibility in terms of performing and/or providing a structure to the way in which operations are performed upon the composite workflow.

For example, the progression of a workflow from one tier to the next requires a user to manually create the records of the next tier. In many situations, the records created for an instance of a composite workflow are of a redundant nature. That is, the user knows that, for every second tier record of a specific type like "Bug Fix", three third tier records need to be created—"Plan", "Develop", and "Test".

Further, a high volume of workflow instances and, therefore, "Bug Fix" records results in a large quantity of redundant actions performed by the user. A large quantity of redundant manual operations increases the possibility of user error during entry. The composite workflow tool/system lacks the ability for the user to automate the performance of this redundant activity.

While the hierarchical structure of a composite workflow provides relationships in a vertical direction (i.e., parent-child), it does not allow the establishment of any horizontal relationships (i.e., sibling). As such, the composite workflow tool/system allows the creation of situations that users know to be illogical.

Using the previous example, it is possible for a user to activate (i.e., place in a state of active work) the "Plan", "Develop", and "Test" records, when, logically, these tasks need to be performed sequentially. Thus, the test and development users receive notification that they should be performing work, when the source of their tasks is unavailable. Further, their records stay in the active state and provide inappropriate metrics for their work (i.e., the record was active for 33 days, though the user spent 25 of those days waiting for their source data).

Unfortunately, work-arounds to such problems encountered result in hard-coded solutions to the underlying schema of the composite workflow. Such attempted solutions reduce the nature of the workflow from composite back to linear. Further, a hard-coded solution compromises the flexibility of the composite workflow schema, impeding its maintenance and ability to adapt to changing business needs.

BRIEF SUMMARY

One aspect of the present invention can include a method for automating changes to a composite workflow with user-defined workflow policies. A state change can be detected by a workflow policy handler for a record of an instance of a composite workflow running within a composite workflow system. User-defined workflow policies can be identified for the composite workflow in which the change was detected. A user-defined workflow policy can define policy actions to be performed when policy conditions are satisfied. For each identified user-defined workflow policy, the applicability to the instance of the composite workflow can be determined. When an identified user-defined workflow policy is determined to be applicable, the policy actions can be automatically performed on the instance of the composite workflow.

Another aspect of the present invention can include a method for temporarily granting permissions within a composite workflow system. At least two user-defined workflow policies can be identified as executable upon a current instance of a composite workflow running in a composite workflow system by a workflow policy handler. A user-defined workflow policy can define policy actions to be performed when policy conditions are satisfied. A user-defined workflow policy can be deemed executable when the policy conditions have been satisfied by values of the current instance of the composite workflow. The capability for a user associated with the current instance of the composite workflow to perform the policy actions of a first user-defined workflow policy within the composite workflow system can be assessed. When the user is determined to be incapable of performing the policy actions, the remaining user-defined workflow policies identified as executable can be searched for a second user-defined workflow policy having a policy action that temporarily grants the user the capability necessary to perform the policy actions of the first user-defined workflow policy. When the second user-defined workflow policy exists, its policy action can be executed. The policy actions of the first user-defined workflow policy can then be immediately performed.

Still another aspect of the present invention can include a system that uses user-defined workflow policies to automate changes to a composite workflow. Such a system can include composite workflows, a composite workflow system, user-defined workflow policies, and a workflow policy handler. The composite workflows can include records that represent the steps of a business process, arranged in a hierarchical structure. The composite workflow system can be configured to support activities involving the composite workflows. The user-defined workflow policies can define actions to be automatically performed upon an instance of a composite workflow. The workflow policy handler can be configured to interact with the composite workflow system to execute the user-defined workflow policies determined to be applicable to the instance of the composite workflow currently running in the composite workflow system.

Yet another aspect of the present invention can include a computer program product that includes a computer readable storage medium having embedded computer usable program code. The computer usable program code can be configured to detect a state change to a record of an instance of a composite workflow running within a composite workflow system. Then, the computer usable program code can be configured to identify user-defined workflow policies associated with the composite workflow in which the change was detected. A user-defined workflow policy can define policy actions to be performed when policy conditions are satisfied. The computer usable program code can be configured to, for each identified user-defined workflow policy, determine the applicability of the user-defined workflow policy to the instance of the composite workflow. The computer usable program code can then be configured to, when the identified user-defined workflow policy is determined to be applicable, automatically perform the policy actions of the identified user-defined workflow policy upon a record in the instance of the composite workflow.

DETAILED DESCRIPTION

Figure 1:
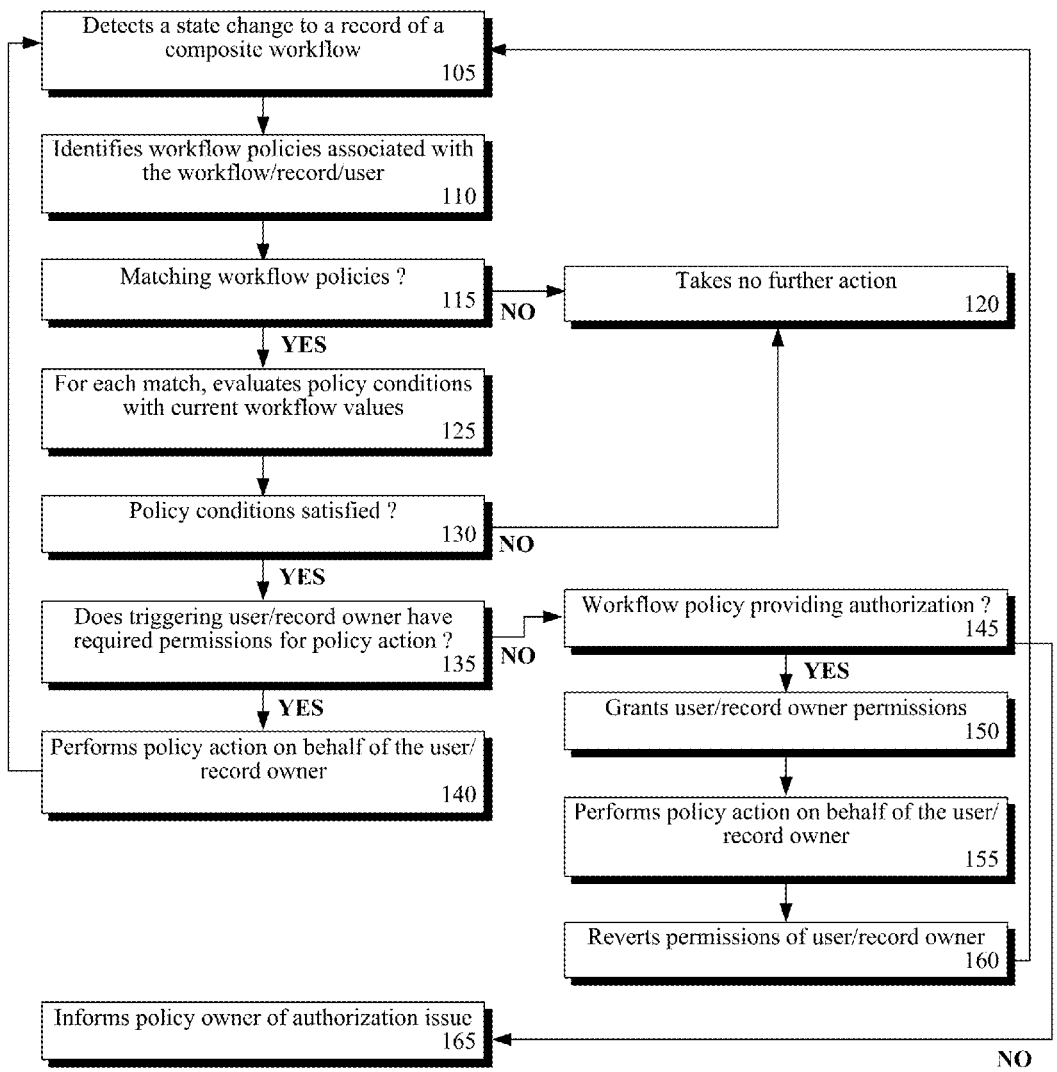
FIG. 1 is a flow chart of a method detailing, in general, the use of user-defined workflow policies by a workflow policy handler in conjunction with a composite workflow tool/system to automate changes to a composite workflow in accordance with embodiments of the inventive arrangements disclosed herein.

The present invention discloses a solution for utilizing user-defined workflow policies to automate changes to a composite workflow within a composite workflow system. Workflow policies can be defined by users to capture actions that should be automatically performed on behalf of the user when a specified set of conditions are met. Additionally, workflow policies can be used to temporarily grant user permissions to make a change to the composite workflow that their predefined role does not allow. A workflow policy handler can detect changes to composite workflows within the composite workflow system and determine which, if any, workflow policies should be applied to the composite workflow.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flow chart of a method 100 detailing, in general, the use of user-defined workflow policies by a workflow policy handler in conjunction with a composite workflow tool/system to automate changes to a composite workflow in accordance with embodiments of the inventive arrangements disclosed herein.

Method 100 can begin in step 105 where the workflow policy handler can detect a state change to a record of a composite workflow. It should be noted that the state change detected in step 105 can be the result of manual intervention by a user of the composite workflow tool/system or an automated action performed by a previous execution of method 100.

Workflow policies can be identified in step 110 that pertain to the composite workflow, workflow record, and/or user associated with the composite workflow/workflow record. A user-defined workflow policy, herein referred to as a workflow policy, can be an electronic document expressing a business or workflow-specific rule in terms of triggering conditions and a resultant action performed when the conditions are satisfied.

For example, a workflow policy can indicate that, when all third-tier records are in the "Completed" state, the state of the parent second-tier should be changed to "Completed".

In step 115, it can be determined if there are workflow policies that match the conditions associated with this instance of the composite workflow/record/user. When no matching workflow policies are found, step 120 can execute where the workflow policy handler takes no further action.

When matching workflow policies are found, the policy conditions of each matching workflow policy can be evaluated with the values of the current workflow instance in step 125. In step 130, it can be determined if the policy conditions have been satisfied.

When the policy conditions are not satisfied, method 100 can flow to step 120 where the workflow policy handler takes no further action. When the policy conditions are satisfied, step 135 can execute where it can be determined if the triggering user or the record owner possesses the required permissions to perform the policy action, The importance of step 135 should be emphasized and expanded upon. The ability for users of a composite workflow tool/system to perform various actions can be controlled and these restrictions stringently enforced.

For example, a composite workflow tool/system can utilize predefined user roles to identify allowable actions for the users who are assigned the specific role. Thus, a user having the role of "Project Head" can perform only those actions defined by their role; a user of role "Team Lead" can perform only "Team Lead" actions, and so on. Business practices can often dictate that a user's role only changes when warranted by an organizational/job change by the user.

As such, a "Team Lead" cannot have a "Team Member" perform an action on their behalf, even if the "Team Lead" authorizes the "Team Member" to do so. However, utilizing an embodiment of the present disclosure, such authorization can be captured and enabled as a workflow policy, as illustrated in method 100.

When the triggering user or record owner does not have the required permissions (i.e., user role, network access, etc.), step 145 can execute where the workflow policy handler can determine if a workflow policy exists that provides authorization for the performance of the policy action. For example, a workflow policy can indicate that, under specified circumstances, "Team Members" can perform a specific action typically reserved for "Team Leads".

When a workflow policy does not exist that provides authorization for the policy action, flow of method 100 can proceed to step 165 where the policy owner can be informed of the issue with authorization for the policy action (i.e., the user forgot to create a workflow policy providing authorization).

When a workflow policy exists that provides authorization for the policy action, the user/record owner can be granted the proper permissions in step 150. Granting the permissions required for the user/record owner to perform the policy action can be handled in a variety of ways and as appropriate for the type of policy action being performed.

For example, instructions can be executed within the composite workflow tool/system to assign the specific action to the user, bypassing the role definition. In a federated environment, record modification can be required to be performed only in the source database. This can require the workflow policy handler to interact with network-level permission handlers in order to gain access to the source database in order to execute the policy action.

In step 155, the workflow policy handler can perform the policy action on behalf of the user/record owner. The permissions of the user/record owner can be reverted in step 160. That is, the permissions granted in step 150 can be on a temporary basis (i.e., long enough to perform the policy action). From step 160, flow can return to step 105 to represent the next iteration of method 100.

When it is determined, in step 135, that the triggering user/record owner already has the required permissions, the policy action can be performed on behalf of the user/record owner in step 140. Step 140 can represent an example where a user automates an action that they routinely perform.

In one embodiment, roles can be associated with nodes in a workflow, where the nodes are represented in a set of hierarchically established tiers. Each node in the workflow can have role-based permissions associated with it. Role-based permissions can be granted to a node (steps 145-160), which are inherited from another node to permit successful completion of an action. For example, one node may be owned by a country X and another node by a country Y. The inherited permissions can be auctioned from the country which owns the node (country X) to country Y to perform a specific action.

Using the above example, if a request is opened in England (e.g., country Y), but all created tasks are owned by Hungary (e.g., country X), then only Hungary may be able to open new tasks upon creation of a request. Assuming for this example that a replicated environment exists where equivalent data exists in both countries. Hence, using method 100, a request creator can inherent permissions which enables them to "go to Hungary" even though they are based in England in order to create or close off a task.

Figure 2:
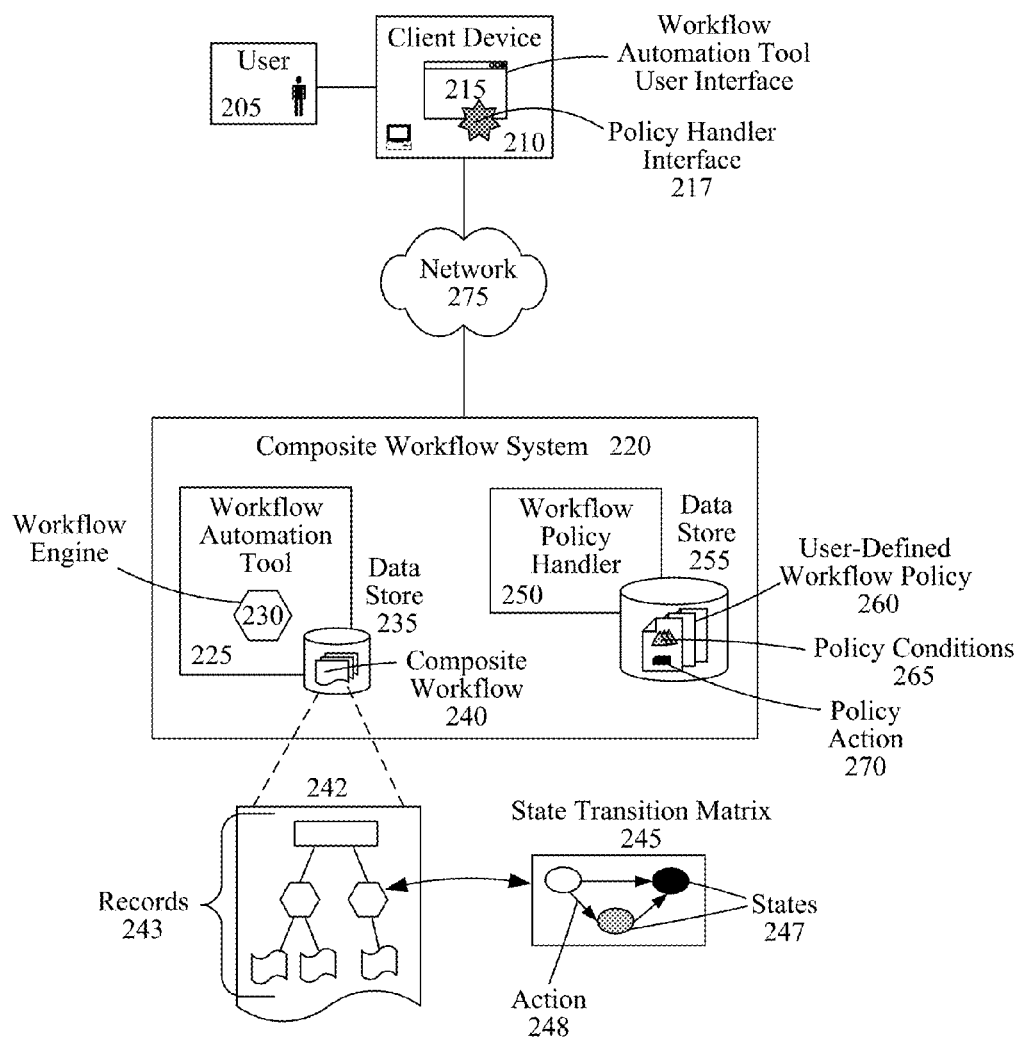
FIG. 2 is a schematic diagram illustrating a system that utilizes user-defined workflow policies to automate changes to a composite workflow in accordance with an embodiment of the inventive arrangements disclosed herein.

FIG. 2 is a schematic diagram illustrating a system 200 that utilizes user-defined workflow policies 260 to automate changes to a composite workflow 240 in accordance with embodiments of the inventive arrangements disclosed herein. System 200 can perform the steps of method 100.

In system 200, a user 205 can create user-defined workflow policies 260, herein referred to as workflow policies 260, for execution upon composite workflows 240 within the composite workflow system 220. The composite workflow system 220 can represent the hardware and/or software components required to manage the performance of composite workflows 240.

The composite workflow system 220 can include a workflow automation tool 225 and a workflow policy handler 250. It should be noted that the composite workflow system 220 can include additional components (not shown) for other auxiliary functions without limiting or detracting from this embodiment of the present disclosure.

The workflow automation tool 225 can represent a software application that implements functions for the creation, management, and execution of composite workflows 240. The workflow automation tool 225 can include a workflow engine 230 configured to execute the machine-readable instructions representing the composite workflow 240 and a data store 235 for storing the composite workflows 240.

In general, a workflow can represent a series of steps that define a business process. A composite workflow 240 can represent a workflow whose steps are represented in a hierarchical structure as opposed to a flat or linear structure. Example composite workflow 242 can illustrate a three-tier hierarchy of records 243 like one that can be utilized with RATIONAL CLEARQUEST 225.

Each record 243 can represent a step of the example composite workflow 242 and associated data like owner, assigned user, type, etc. As common to a composite workflow 240, each record 243 can have an associated state transition matrix 245 that defines the states 247 that the record 243 can have and the actions 248 that cause the transitions between the states 247. Hence, each record in the workflow 242 can be considered a node having a set of role-based permissions associated with it. Permissions can be temporarily inherited from one node to another in order to perform a task.

The workflow automation tool 225 can ensure that the user 205 can only perform actions 248 upon a record 243 that are defined in the state transition matrix 245. It should be noted that the structure shown in the example composite workflow 242 and the coloration of the associated state transition matrix 245 can be utilized for further illustrative purposes in proceeding Figures.

The workflow policy handler 250 can represent a software application configured to manage creation and execution of workflow policies 260 upon the composite workflows 240 of the composite workflow system 220. Depending upon the configuration of the composite workflow system 220 and/or implementation of the workflow policy handler 250, the workflow policy handler 250 can also include a listening component (not shown) that monitors the operations performed by the workflow automation tool 225 upon composite workflows 240 in order to collect data to determine if any workflow policies 260 should be executed.

A workflow policy 260 can be an electronic document that expresses a business or workflow-specific rule in terms of policy conditions 265 and a resultant policy action 270. A policy condition 265 can represent a value for data field for which the workflow policy 260 is applicable. The data fields and/or values utilized in the definition of a policy condition 265 can be recognized by the workflow automation tool 225 and/or workflow policy handler 250. That is, policy conditions 265 represent data fields and/or values already defined within the workflow automation tool 225, such as user roles and record types, or accessible to the workflow policy handler 250 like the current date.

A policy action 270 can represent one or more instructions that are to be performed when the policy conditions 265 are satisfied. Policy actions 270 can correspond to actions 248 defined in the state transition matrix 245 of a record 243 as well as system-level commands or requests for external software applications and/or services.

Workflow policies 260 and their conditions 265 and actions 270 can be written in accordance with a standardized language capable of being interpreted/executed by the workflow automation tool 225. Additionally, structural logic like BOOLEAN logic can be used to create logical relationships between the elements of policy conditions 265 and/or policy actions 270. Further, a workflow policy 260 and/or the workflow policy handler 250 can be configured to utilize existing functionality of the workflow automation tool 225 like hooks in RATIONAL CLEARQUEST.

It is important to note that the rules captured by the workflow policies 260 are managed separate to the composite workflows 240 that they affect. As such, workflow policies 260 can be created/modified/deleted for each project handled by the composite workflow system 220 without compromising the underlying flexibility of the composite workflows 240.

Creation and/or modification of a workflow policy 260 can be performed by a user 205 via the policy handler interface 217. The policy handler interface 217 can represent a graphical user interface (GUI) in which the user 205 can perform predefined tasks related to workflow policies 260. The policy handler interface 217 can be a component of the workflow automation tool user interface 215, as shown in this example.

In another embodiment, the policy handler interface 217 can be accessed by the user 205 without the use of the workflow automation tool user interface 215.

The policy handler interface 217 and workflow automation tool user interface 215 can be run upon a client device 210. The client device 210 can represent a variety of computing devices capable of running the user interfaces 215 and 217 and communicating with the composite workflow system 220 over the network 275.

In another contemplated embodiment, the workflow policy handler 250 can be a component of the workflow automation tool 225. In such an embodiment, the workflow policies 260 can reside the data store 235 containing the composite workflows 240.

In yet another embodiment, the workflow policy handler 250 can operate external to the composite workflow system 220, interacting with the workflow automation tool 225 over the network 275.

Network 275 can include any hardware/software/and firmware necessary to convey data encoded within carrier waves. Data can be contained within analog or digital signals and conveyed though data or voice channels. Network 275 can include local components and data pathways necessary for communications to be exchanged among computing device components and between integrated device components and peripheral devices. Network 275 can also include network equipment, such as routers, data lines, hubs, and intermediary servers which together form a data network, such as the Internet. Network 275 can also include circuit-based communication components and mobile communication components, such as telephony switches, modems, cellular communication towers, and the like. Network 275 can include line based and/or wireless communication pathways.

As used herein, presented data stores 235 and 255 can be a physical or virtual storage space configured to store digital information. Data stores 235 and 255 can be physically implemented within any type of hardware including, but not limited to, a magnetic disk, an optical disk, a semiconductor memory, a digitally encoded plastic memory, a holographic memory, or any other recording medium. Data stores 235 and 255 can be stand-alone storage units as well as a storage unit formed from a plurality of physical devices. Additionally, information can be stored within data stores 235 and 255 in a variety of manners. For example, information can be stored within a database structure or can be stored within one or more files of a file storage system, where each file may or may not be indexed for information searching purposes. Further, data stores 235 and/or 255 can utilize one or more encryption mechanisms to protect stored information from unauthorized access.

Figure 3:
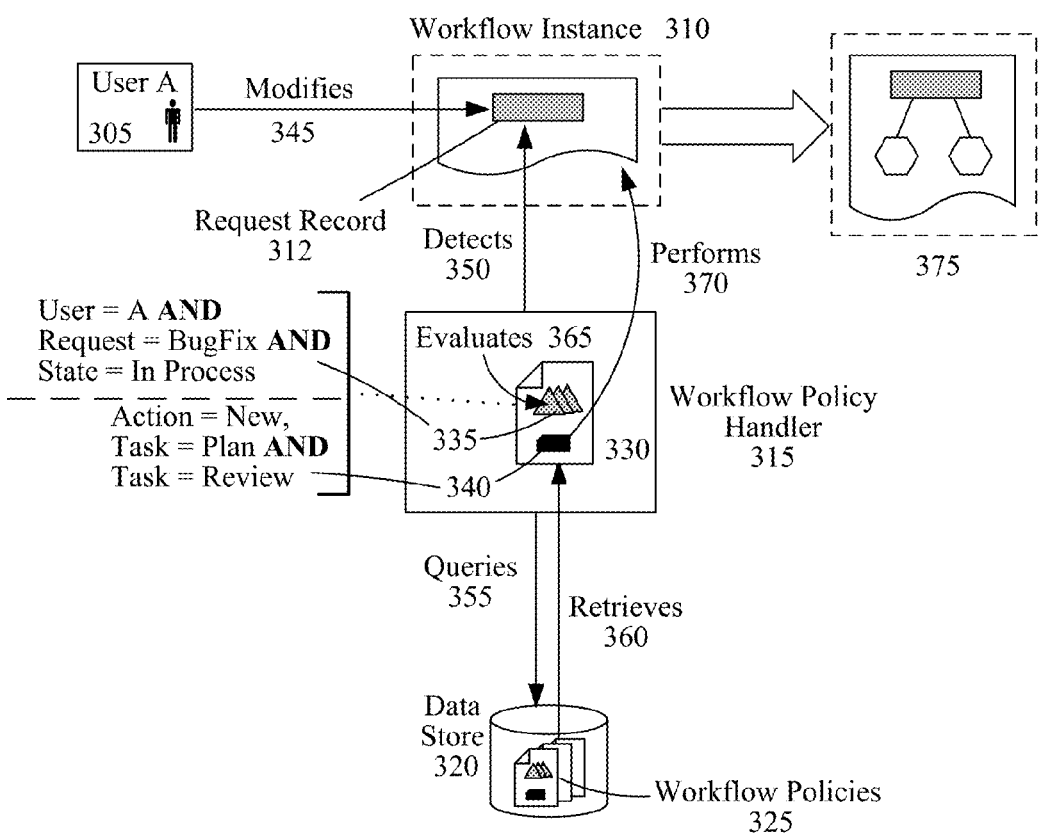
FIG. 3 is an illustrated process flow depicting the operation of the workflow policy handler for an example workflow policy in accordance with an embodiment of the inventive arrangements disclosed herein.

FIG. 3 is an illustrated process flow 300 depicting the operation of the workflow policy handler 315 for an example workflow policy 330 in accordance with embodiments of the inventive arrangements disclosed herein. Process flow 300 can be performed within the context of system 200 and/or in conjunction with method 100.

It is important to reiterate that the structure and state transition matrix of the example composite workflow 240 shown in FIG. 2 is used for illustrative purposes in process flow 300 and subsequent Figures. For the sake of simplicity, each record of the workflow process can follow the same state transition matrix—white (the default or created state) to either grey (the active or in process state) or black (the completed or closed state).

Additionally, the example composite workflow shown in process flow 300 can reflect a defect/feature tracking process for a software application. In such an example, the tiers of the composite workflow can represent a request (first tier), tasks (second tier), and activities (third tier) for addressing a submitted defect/feature.

Process flow 300 can begin with User A 305 modifying 345 the request record 312 of a workflow instance 310. In this example, the modification of the request record 312 can be a state change from white to grey (submitted to in process). User A 305 can be a user of the composite workflow system having a role capable of modifying request records 312, like a customer account manager or product manager.

The workflow policy handler 315 can then detect 350 the state change of the request record 312 and query 355 the workflow policies 325 in the data store 320. Workflow policies 325 applicable to the detected 350 change can be retrieved 360. The retrieval of workflow policies 325 can be performed on the basis of metadata or keywords, requiring less time than a query of the entire workflow policy 325.

In this example, workflow policy 330 has been retrieved 360 by the workflow policy handler 315. Workflow policy 330 can have policy conditions 335 stating that the workflow policy 330 is applicable to situations where User A 305 changes the state of a request record 312 is of the type 'Bug-Fix' to 'In Process'.

Evaluation 365 of the policy conditions 335 can indicate that the policy conditions 335 are satisfied and the policy action 340 of the workflow policy 330 should be applied to the workflow instance 310. In this example, the policy action 340 can state that new task records named 'Plan' and 'Review' should be created. Thus, workflow policy 330 can exemplify the automation of a redundant record creation process that User A 305 would usually perform manually for each 'Bug-Fix' request record 312.

It should be emphasized that the example text representing the policy conditions 335 and policy actions 340 are for illustrative purposes only, and are not meant as an exact or exhaustive representation of any embodiment of the present disclosure. Further, this example text attempts to convey a representation of the workflow policy 330 in simple and implementation-independent terms.

The workflow policy handler 315 can then perform 370 the policy action 340 upon the request record 312 of the workflow instance 310, resulting in workflow instance 375. It should be noted that workflow instance 310 and workflow instance 375 are not separate workflow instances; merely snapshots of the same workflow instance at two points in its progression.

It is also important to note that the policy action 340 of the workflow policy 330 can include the population of data fields associated with the records of the workflow instance 310, such as automatically populating who the record is assigned to or a due date.

As used herein, presented data store 320 can be a physical or virtual storage space configured to store digital information. Data store 320 can be physically implemented within any type of hardware including, but not limited to, a magnetic disk, an optical disk, a semiconductor memory, a digitally encoded plastic memory, a holographic memory, or any other recording medium. Data store 320 can be stand-alone storage units as well as a storage unit formed from a plurality of physical devices. Additionally, information can be stored within data store 320 in a variety of manners. For example, information can be stored within a database structure or can be stored within one or more files of a file storage system, where each file may or may not be indexed for information searching purposes. Further, data store 320 can utilize one or more encryption mechanisms to protect stored information from unauthorized access.

Figure 4:
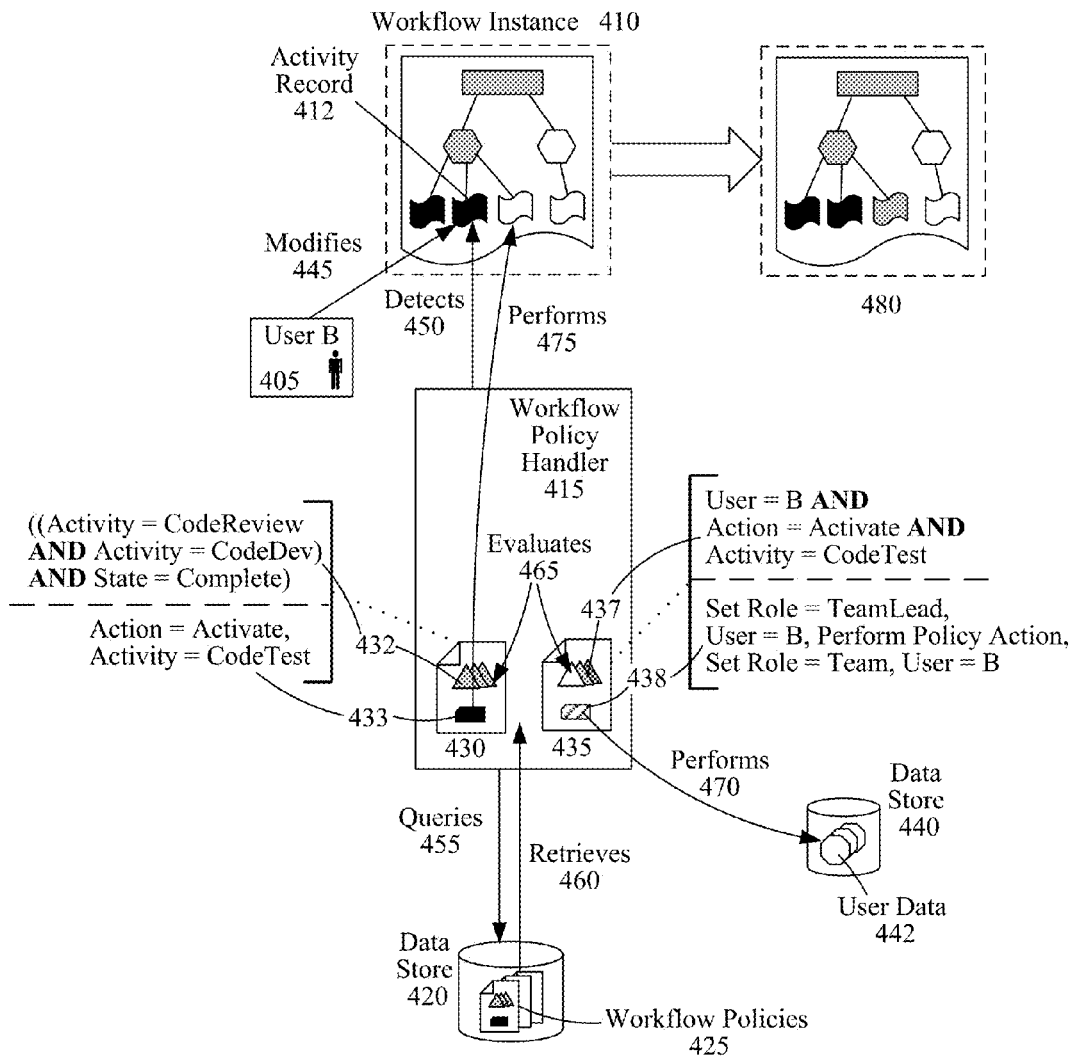
FIG. 4 is an illustrated process flow depicting the operation of the workflow policy handler for example workflow policies in accordance with embodiments of the inventive arrangements disclosed herein.

FIG. 4 is an illustrated process flow 400 depicting the operation of the workflow policy handler 415 for example workflow policies 430 and 435 in accordance with embodiments of the inventive arrangements disclosed herein. Process flow 400 can be performed within the context of system 200 and/or in conjunction with method 100.

It is important to reiterate that the structure and state transition matrix of the example composite workflow 240 shown in FIG. 2 is used for illustrative purposes in process flow 400 and subsequent Figures. For the sake of simplicity, each record of the workflow process can follow the same state transition matrix—white (the default or created state) to either grey (the active or in process state) or black (the completed or closed state).

Additionally, the example composite workflow shown in process flow 400 can reflect a defect/feature tracking process for a software application. In such an example, the tiers of the composite workflow can represent a request (first tier), tasks (second tier), and activities (third tier) for addressing a submitted defect/feature.

Process flow 400 can begin with User B 405 modifying 445 an activity record 412 of a workflow instance 410. In this example, the modification of the activity record 412 can be a state change from grey to black (in process to completed). User B 405 can be a user of the composite workflow system having a role capable of modifying activity records 412, like a software development team member.

The workflow policy handler 415 can then detect 450 the state change of the activity record 412 and query 455 the workflow policies 425 in the data store 420. Workflow policies 425 applicable to the detected 450 change can then be retrieved 460. The retrieval of workflow policies 425 can be performed on the basis of metadata or keywords, requiring less time than a query of the entire workflow policy 425.

In this example, workflow policies 430 and 435 have been retrieved 460 by the workflow policy handler 415. Workflow policy 430 can have policy conditions 432 stating that the workflow policy 430 is applicable to situations where activity records 412 named 'CodeReview' and 'CodeDev' are both in the 'Complete' state (i.e., the two blackened activity records 412 shown in the workflow instance 410).

Evaluation 465 of the policy conditions 432 of workflow policy 430 can indicate that the policy conditions 432 are satisfied and the policy action 433 of the workflow policy 430 should be applied to the workflow instance 410. Workflow policy 430 can exemplify the sequential activation of sibling records 412 within a workflow instance 410. In this example, the policy action 433 can indicate that the action 'Activate' (defined in the state transition matrix) should be performed on the activity record 412 named 'CodeTest', changing the state of the 'CodeTest' activity record 412 from white to grey (submitted to in process).

However, when the workflow policy handler 415 attempts to perform 475 the policy action 433, it can be discovered that User B 405 is unable to execute an 'Activate' action on activity records 412 (i.e., User B's 405 role within the composite workflow system does not allow this action). Alternately, the workflow policy handler 415 can simply assess User B's 405 permissions and/or role to determine their ability/inability to perform the policy action 433 without actually attempting execution of the policy action 433.

It should be noted that the workflow policy handler 415 can be configured to include additional logic for handling the execution of multiple workflow policies 430 and 435 for a single workflow instance 410. For example, metadata associated with the workflow policies 430 and 435 can contain priority data to indicate an order in which the workflow policies 430 and 435 should be evaluated and performed.

At this point, the workflow policy handler 415 can be configured to look for other retrieved 460 workflow policies 435 that authorize User B 405 to perform this restricted policy action 433, as detailed in method 100. In this example, workflow policy 435 can provide such authorization.

Evaluation of the policy conditions 437 of workflow policy 435 can define applicability for circumstances where User B 405 is attempting to perform an 'Activate' action upon an activity record 412 named 'CodeTest'. Since these policy conditions 437 are satisfied by the policy action 433 pending execution from workflow policy 430, the policy action 438 of workflow policy 435 can be executed.

The policy action 438 of workflow policy 435 can indicate that the role of User B 405 is to be temporarily set to 'Team Lead' to perform the pending policy action 433, and then set back to the role of 'Team'. Thus, the workflow policy handler 415 can perform 470 the policy action 438 upon the user data 442 for User B 405 contained in a data store 440 of the composite workflow system.

It should be emphasized that the example text representing the policy conditions 432 and 437 and policy actions 433 and 438 are for illustrative purposes only, and are not meant as an exact or exhaustive representation of any embodiment of the present disclosure. Further, this example text attempts to convey representations of the workflow policies 430 and 435 in simple and implementation-independent terms.

For example, although the examples are described in terms of two users (User A and User B) permissions against activity records in the workflow instance 410 can be assigned on other basis. The records can be considered nodes in a tiered workflow instance 410, where node specific role-based permissions can exist. For example, different nodes can be owned by different countries, where inherited permissions among nodes can be permissions granted across countries.

Turning back to the example of FIG. 4, once User B 405 has the proper permissions, the workflow policy handler 415 can then perform 475 the policy action 433 from workflow policy 430 upon the 'CodeTest' activity record contained in the workflow instance 410, resulting in workflow instance 480. It should be noted that workflow instance 410 and workflow instance 480 are not separate workflow instances; merely snapshots of the same workflow instance at two points in its progression.

It is also important to note that the policy action 433 of the workflow policy 430 can include the population of data fields associated with the records of the workflow instance 410, such as automatically populating who the record is assigned to or a due date.

As used herein, presented data stores 420 and 440 can be a physical or virtual storage space configured to store digital information. Data stores 420 and 440 can be physically implemented within any type of hardware including, but not limited to, a magnetic disk, an optical disk, a semiconductor memory, a digitally encoded plastic memory, a holographic memory, or any other recording medium. Data stores 420 and 440 can be stand-alone storage units as well as a storage unit formed from a plurality of physical devices. Additionally, information can be stored within data stores 420 and 440 in a variety of manners. For example, information can be stored within a database structure or can be stored within one or more files of a file storage system, where each file may or may not be indexed for information searching purposes. Further, data stores 420 and/or 440 can utilize one or more encryption mechanisms to protect stored information from unauthorized access.

Figure 5:
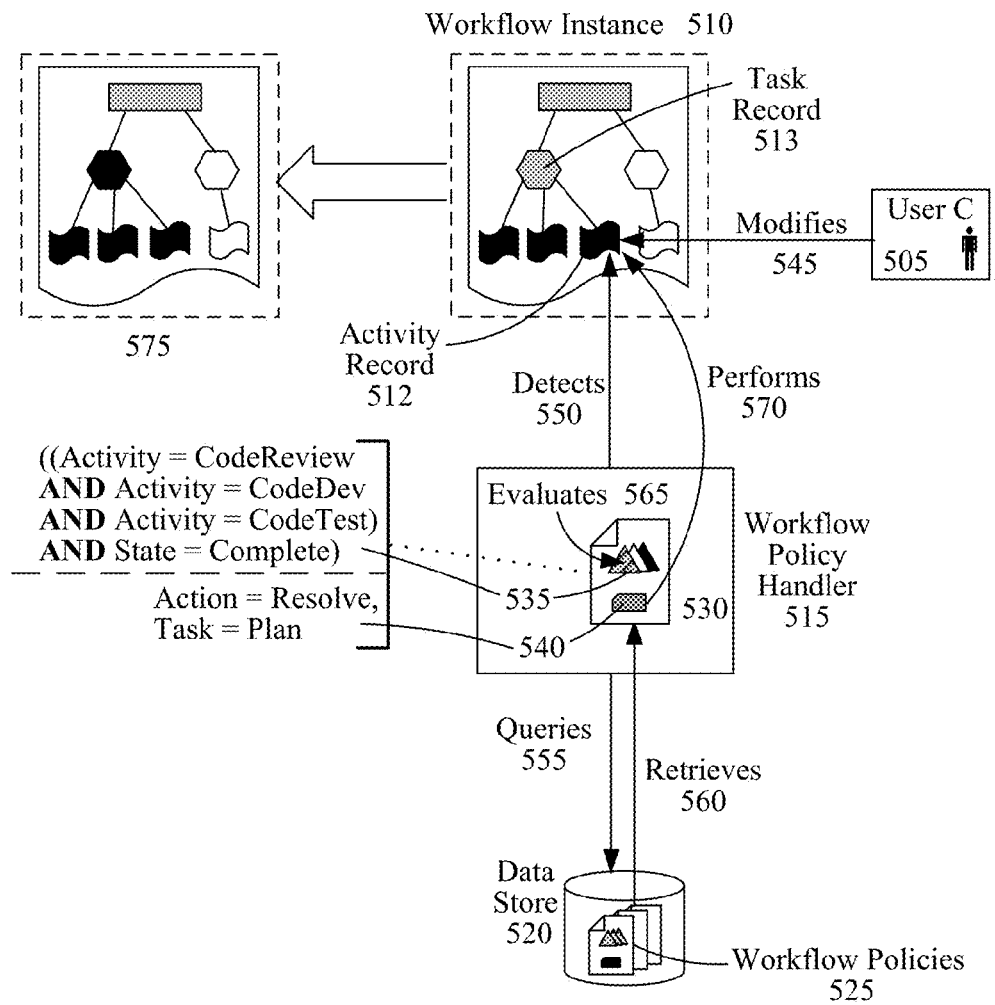
FIG. 5 is an illustrated process flow depicting the operation of the workflow policy handler for an example workflow policy in accordance with embodiments of the inventive arrangements disclosed herein.

FIG. 5 is an illustrated process flow 500 depicting the operation of the workflow policy handler 515 for an example workflow policy 530 in accordance with embodiments of the inventive arrangements disclosed herein. Process flow 500 can be performed within the context of system 200 and/or in conjunction with method 100.

It is important to reiterate that the structure and state transition matrix of the example composite workflow 240 shown in FIG. 2 is used for illustrative purposes in process flow 500. For the sake of simplicity, each record of the workflow process can follow the same state transition matrix—white (the default or created state) to either grey (the active or in process state) or black (the completed or closed state).

Additionally, the example composite workflow shown in process flow 500 can reflect a defect/feature tracking process for a software application. In such an example, the tiers of the composite workflow can represent a request (first tier), tasks (second tier), and activities (third tier) for addressing a submitted defect/feature.

Process flow 500 can begin with User C 505 modifying 545 the activity record 512 of a workflow instance 510. In this example, the modification of the activity record 512 can be a state change from grey to black (in process to complete). User C 505 can be a user of the composite workflow system having a role capable of modifying task 513 and activity records 512, like a team leader or developer.

The workflow policy handler 515 can then detect 550 the state change of the activity record 512 and query 555 the workflow policies 525 in the data store 520. Workflow policies 525 applicable to the detected 550 change can be retrieved 560. The retrieval of workflow policies 525 can be performed on the basis of metadata or keywords, requiring less time than a query of the entire workflow policy 525.

In this example, workflow policy 530 has been retrieved 560 by the workflow policy handler 515. Workflow policy 530 can have policy conditions 535 stating that the workflow policy 530 is applicable to situations where the state of the 'CodeReview', 'CodeDev', and 'CodeTest' activity records 512 are all set to 'Complete'.

Evaluation 565 of the policy conditions 535 can indicate that the policy conditions 535 are satisfied and the policy action 540 should be applied to the workflow instance 510. Workflow policy 530 can exemplify the automatic progression of a task record 513 once all of its activity records 512 have been completed. In this example, the policy action 540 can indicate that the action 'Resolve' (defined in the state transition matrix) should be performed on the task record 513 named 'Plan', changing the state of the 'Plan' task record from grey to black (in process to complete).

It should be emphasized that the example text representing the policy conditions 535 and policy actions 540 are for illustrative purposes only, and are not meant as an exact or exhaustive representation of any embodiment of the present disclosure. Further, this example text attempts to convey a representation of the workflow policy 530 in simple and implementation-independent terms.

The workflow policy handler 515 can then perform 570 the policy action 540 upon the task record 513 of the workflow instance 510, resulting in workflow instance 575. It should be noted that workflow instance 510 and workflow instance 575 are not separate workflow instances; merely snapshots of the same workflow instance at two points in its progression.

It is also important to note that the policy action 540 of the workflow policy 530 can include the population of data fields associated with the records of the workflow instance 510, such as automatically populating who the record is assigned to or a due date.

As used herein, presented data store 520 can be a physical or virtual storage space configured to store digital information. Data store 520 can be physically implemented within any type of hardware including, but not limited to, a magnetic disk, an optical disk, a semiconductor memory, a digitally encoded plastic memory, a holographic memory, or any other recording medium. Data store 520 can be stand-alone storage units as well as a storage unit formed from a plurality of physical devices. Additionally, information can be stored within data store 520 in a variety of manners. For example, information can be stored within a database structure or can be stored within one or more files of a file storage system, where each file may or may not be indexed for information searching purposes. Further, data store 520 can utilize one or more encryption mechanisms to protect stored information from unauthorized access.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product comprising a non-transitory computer readable storage medium having computer usable program code embodied therewith, the computer usable program code comprising:
 computer usable program code configured to detect a state change to a record of an instance of a composite workflow running within a composite workflow system;
 computer usable program code configured to identify at least one user-defined workflow policy associated with the composite workflow in which the record change was detected by capturing a plurality of data fields and associated data values regarding the instance of the composite workflow and an identifier of at least one user associated with the record for which the state change occurred wherein the plurality of data fields are predefined, wherein a user-defined workflow policy defines at least one policy action to be performed upon satisfaction of at least one policy condition, wherein the record comprises:
  a state transition matrix defining states that the record can have;
  the at least one policy action which causes a transition between the states; and
  a set of role based permissions for accessing the record;
 computer usable program code configured to, for each identified user-defined workflow policy, determine an applicability to the instance of the composite workflow in which the change was detected by ascertaining the captured data values to evaluate the at least one policy condition;
 computer usable program code configured to denote the at least one identified user-defined workflow policy as applicable if the at least one policy condition is satisfied; and
 computer usable program code configured to, if the at least one identified user-defined workflow policy is determined to be applicable, automatically perform the at least one policy action of the said at least one identified user-defined workflow policy to at least one record in the instance of the composite workflow.

2. The computer program product of claim 1, wherein identifying the at least one user-defined workflow policy further comprises:
 computer usable program code configured to query a plurality of user-defined workflow policies using the captured plurality of data fields and associated data values and the identifier of the at least one user.

3. The computer program product of claim 2, wherein the querying of the plurality of user-defined workflow policies targets a plurality of metadata associated with each user-defined workflow policy.

4. The computer program product of claim 3, wherein, if at least two policy conditions are coupled by at least one BOOLEAN operator, the evaluation of the at least two policy conditions is performed in accordance with an established order precedence for BOOLEAN operations, wherein the evaluation of the at least two policy conditions coupled by the at least one BOOLEAN operator as TRUE denotes satisfaction of the at least two policy conditions.

5. The computer program product of claim 1, wherein, upon determination of applicable user-defined workflow policies and prior to the performance of the at least one policy action, said method further comprises:
 computer usable program code configured to assess a capability for a user associated with the detected state change to perform the at least one policy action of a first user-defined workflow policy within the composite workflow system;
 computer usable program code configured to, if the user is determined to be incapable of performing the at least one policy action, search user-defined workflow policies determined as applicable for a second user-defined workflow policy, wherein the at least one policy action of the second user-defined workflow policy temporarily grants the user the capability to perform the at least one policy action of the first user-defined workflow policy; and computer usable program code configured to, if the second user-defined workflow policy exists, execute the at least one policy action of the second user-defined workflow policy prior to the at least one policy action of the first user-defined workflow policy, whereby the user is able to perform the at least one policy action of the first user-defined workflow policy.

6. The computer program product of claim 5, further comprising:

computer usable program code configured to, if the second user-defined workflow policy is non-existent, inform an owner of the first user-defined workflow policy of the incapability of the user to perform the at least one policy action of the first user-defined workflow policy.

7. The computer program product of claim 1, wherein the composite workflow system comprises a workflow automation tool configured for creation, management, and execution of the plurality of composite workflows.

8. The computer program product of claim 7, further comprising a listening component configured for determining if any of the plurality of user-defined workflow policies should be executed based on data collected by monitoring operations performed by the workflow automation tool upon the plurality of composite workflows.

9. The computer program product of claim 1, further comprising computer usable program code configured to create, manage, and execute the composite workflow.

10. The computer program product of claim 9, further comprising computer usable program code configured to determine if the at least one user-defined workflow policy should be executed based on data collected by monitoring operations performed by a workflow automation tool upon the composite workflow.

11. A system comprising:
one or more processors;
one or more non-transitory storage mediums storing program instructions, wherein the one or more processors execute the program instructions to:
detect a state change to a record of an instance of a composite workflow running within a composite workflow system by a workflow policy handler, wherein the record comprises:
a state transition matrix defining states that the record can have;
at least one policy action which causes a transition between the states; and
a set of role based permissions for accessing the record;
identify at least one user-defined workflow policy associated with the composite workflow in which record the change was detected by capturing a plurality of data fields and associated data values regarding the instance of the composite workflow and an identifier of at least one user associated with the record for which the state change occurred, wherein the plurality of data fields are predefined, wherein a user-defined workflow policy defines the at least one policy action to be performed upon satisfaction of at least one policy condition;
for the at least one identified user-defined workflow policy, determine an applicability to the instance of the composite workflow in which the change was detected, by ascertaining the captured data values to evaluate the at least one policy condition;
denote the at least one identified user-defined workflow policy as applicable if the at least one policy condition is satisfied; and
if the at least one identified user-defined workflow policy is determined to be applicable, automatically perform the at least one policy action of the said at least one identified user-defined workflow policy to at least one record in the instance of the composite workflow.

12. The system of claim 11, wherein executing the program instructions to identify the at least one user-defined workflow policy further comprises the one or more processors executing the program instructions to:
query a plurality of user-defined workflow policies using the captured plurality of data fields and associated data values and the identifier of the at least one user.

13. The system of claim 12, wherein executing the program instructions to query the plurality of user-defined workflow policies targets a plurality of metadata associated with each user-defined workflow policy.

14. The system of claim 12, wherein, if at least two policy conditions are coupled by at least one BOOLEAN operator, the evaluation of the at least two policy conditions is performed in accordance with an established order precedence for BOOLEAN operations, wherein the evaluation of the at least two policy conditions coupled by the at least one BOOLEAN operator as TRUE denotes satisfaction of the at least two policy conditions.

15. The system of claim 11, wherein, upon determination of applicable user-defined workflow policies and prior to the performance of the at least one policy action, said one or more processors execute the program instructions to:
assess a capability for a user associated with the detected state change to perform the at least one policy action of a first user-defined workflow policy within the composite workflow system;
if the user is determined to be incapable of performing the at least one policy action, search user-defined workflow policies determined as applicable for a second user-defined workflow policy, wherein the at least one policy action of the second user-defined workflow policy temporarily grants the user the capability to perform the at least one policy action of the first user-defined workflow policy; and
if the second user-defined workflow policy exists, execute the at least one policy action of the second user-defined workflow policy prior to the at least one policy action of the first user-defined workflow policy, whereby the user is able to perform the at least one policy action of the first user-defined workflow policy.

* * * * *